Nov. 20, 1962 W. E. GLENN, JR 3,065,295

ELECTRON BEAM SYSTEM

Filed Dec. 24, 1958 3 Sheets-Sheet 1

Inventor:
William E. Glenn, Jr.,
by Richard R. Brainard
His Attorney.

Nov. 20, 1962 W. E. GLENN, JR 3,065,295

ELECTRON BEAM SYSTEM

Filed Dec. 24, 1958 3 Sheets-Sheet 2

Inventor:
William E. Glenn Jr.,
by Richard R. Brainard
His Attorney.

Inventor:
William E. Glenn Jr.,
by Richard R. Brainard
His Attorney.

United States Patent Office 3,065,295
Patented Nov. 20, 1962

3,065,295

ELECTRON BEAM SYSTEM

William E. Glenn, Jr., Scotia, N.Y., assignor to General Electric Company, a corporation of New York Filed Dec. 24, 1958, Ser. No. 782,958
13 Claims. (Cl. 178—5.4)

Figure 1:
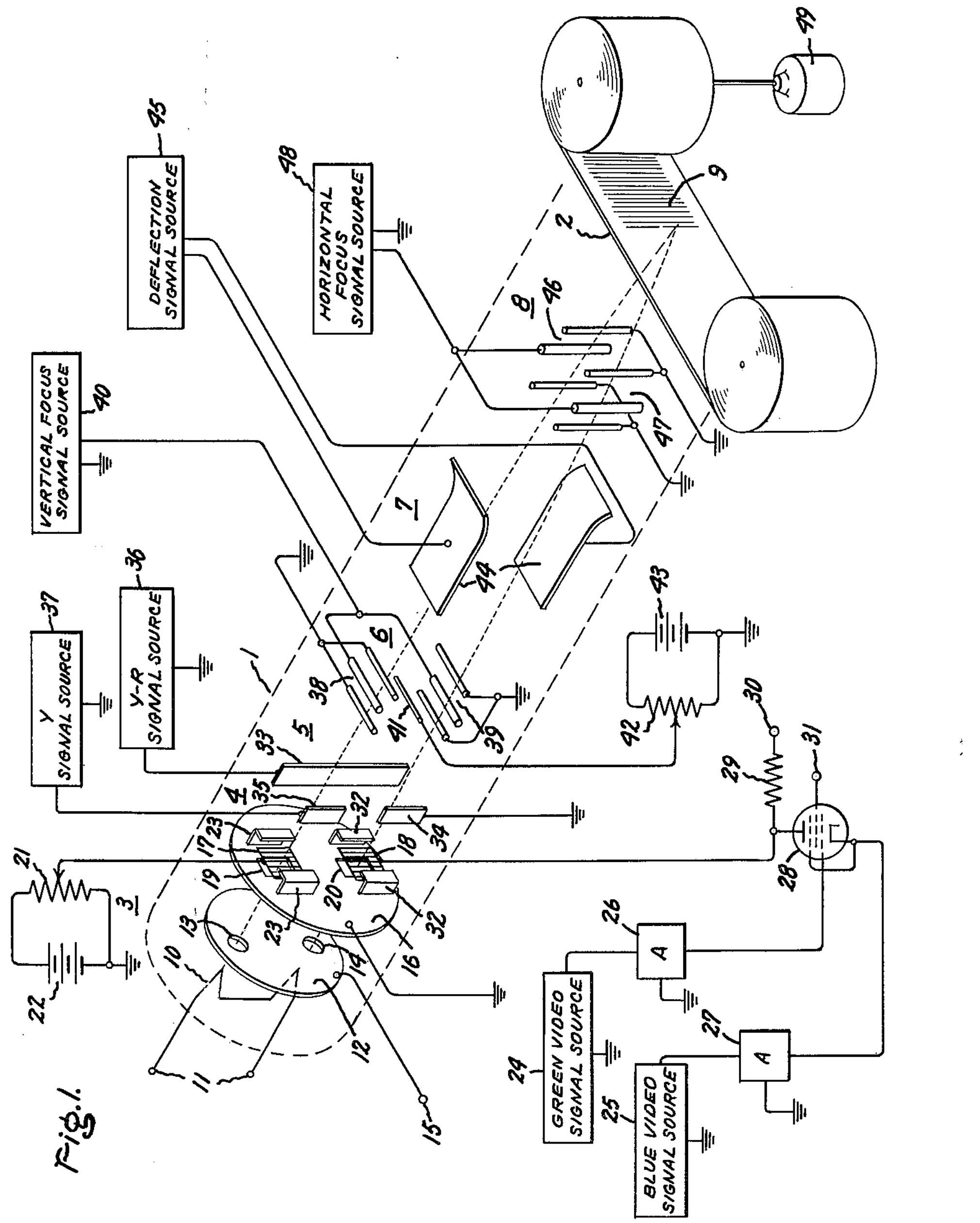

The present invention relates to an electron beam system for forming diffraction gratings in a modulating medium.

A color projection system responsive to color television signals is described and claimed in my Patent No. 2,813,146 which is assigned to the assignee of the present invention. In that system a plurality of charge patterns, each comprised of lines of charge, are simultaneously produced on a deformable light modulating medium by an electron beam modulated with color television signals. The charge densities of the lines of each pattern correspond point-by-point in magnitude with the intensity of a different primary color in a televised picture, and the spacings between the charge lines of any one pattern with the wave-length of the respective primary color. Through electrostatic forces, the charge patterns deform the surface of the deformable light modulating medium into corresponding phase diffraction gratings. When polychrome light is cast on this surface these gratings diffract this light such that certain colors, corresponding to these primary colors, are directed to transparent areas in a light mask. The remainder light is masked. Then the light transmitted by the light mask is focused on a projection screen where it combines to form a color image corresponding to the televised picture.

In one color projection system the electron beam repeatedly deflects over the same area of the modulating medium, which remains in a deformable condition. This medium is termed a "fixed medium" since it is not moved. In this system, the formed diffraction gratings should, ideally, remain at full amplitude for the time of a frame and then decrease to zero amplitude between frames. Then they provide maximum light output but do not interfere with subsequently formed gratings. Unfortunately, present light modulating mediums do not meet these ideal requirements, and there are residual diffraction gratings.

The residual gratings are not of great significance when fixed primary colors are used since the gratings can be synchronized with the horizontal deflection to make them coincident for successive frames. However, in the variable primary color system described and claimed in my copending application S.N. 688,597, now Patent 2,919,302, dated December 29, 1959, which is assigned to the assignee of the present invention, the diffraction gratings for the variable color become phase displaced for successive frames. Then the residual gratings in conjunction with the newly-formed gratings produce interference gratings that adversely affect the quality of the projected picture.

Accordingly, an object of the present invention is to provide an improved electron beam system for producing diffraction gratings in a fixed light modulating medium.

Another object is to provide an electron beam system for forming diffraction gratings corresponding to a variable color, wherein the formation of the gratings is synchronized with the deflection of the electron beam.

Still another object is to provide an improved electron beam system for producing, in a fixed light modulating medium of a variable color projection system, diffraction gratings that for successive frames are coincident for the same colors.

In prior systems the diffraction grating forming operation required modulating of radio frequency carrier signals with applied video signals. This modulating operation necessitates radio frequency oscillator and modulator circuits.

Hence, a further object is to provide an electron beam system for producing diffraction gratings in a light modulating medium without utilizing radio frequency carrier signals.

In one prior electron beam system the modulating medium is moved while the diffraction gratings are formed on it. After the formation of the grating lines the medium is utilized in a suitable optical system. Because of this movement, deflection of the electron beam is required in only on direction—the direction normal to the movement of the medium. In this system the electron beam is deflected normal to the direction of the formation of the grating lines. Because of this deflection, a focusing element that focuses in a direction to make the grating lines have high resolution across their widths, which is where high resolution is desired, cannot be placed between the deflection element and the light modulating medium where this focusing element would have the most effect. If it were placed there, the beam would at times be deflected away from the focusing element axis and thus would be defocused. However, if a system could be provided in which the beam is deflected parallel to the grating lines, the beam even when deflected would always be on the axis of the focusing element.

Thus another object of the present invention is to provide an electron beam system for forming diffraction gratings with grating lines parallel to the direction of the electron beam deflection.

A still further object of the present invention is to provide an electron beam system for producing phase diffraction gratings having high resolution.

These and other objects are achieved in one form of my invention in which one or more electron beams are each split into a set of converging electron beams. The sets are then focused to individual small areas spaced along a line on a light modulating medium. When these beams are deflected in a direction normal to this line they produce lines of charge the separations between which are controlled through control of the angles of beam convergence. These lines of charge produce the deformations to form the desired diffraction gratings.

Figure 2:
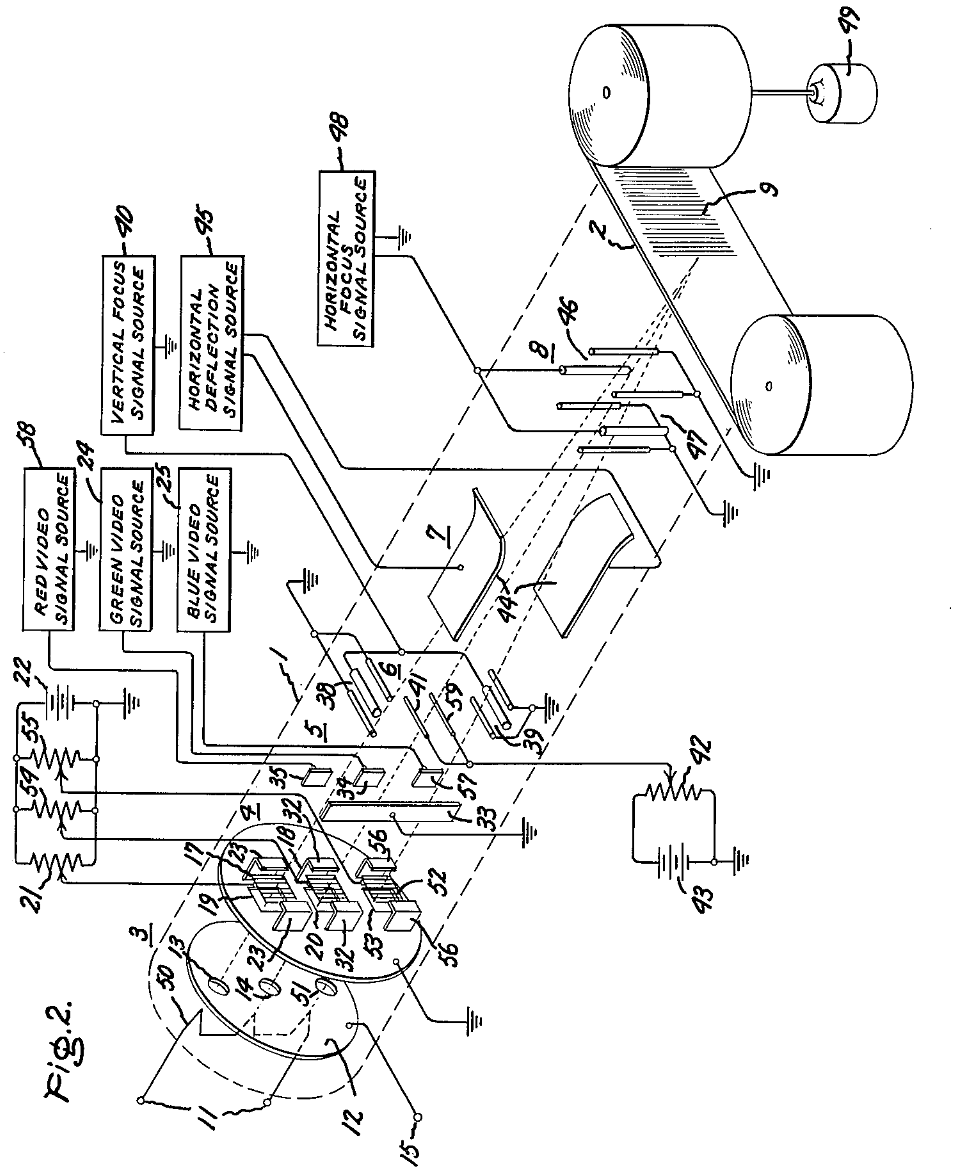
Figure 3:
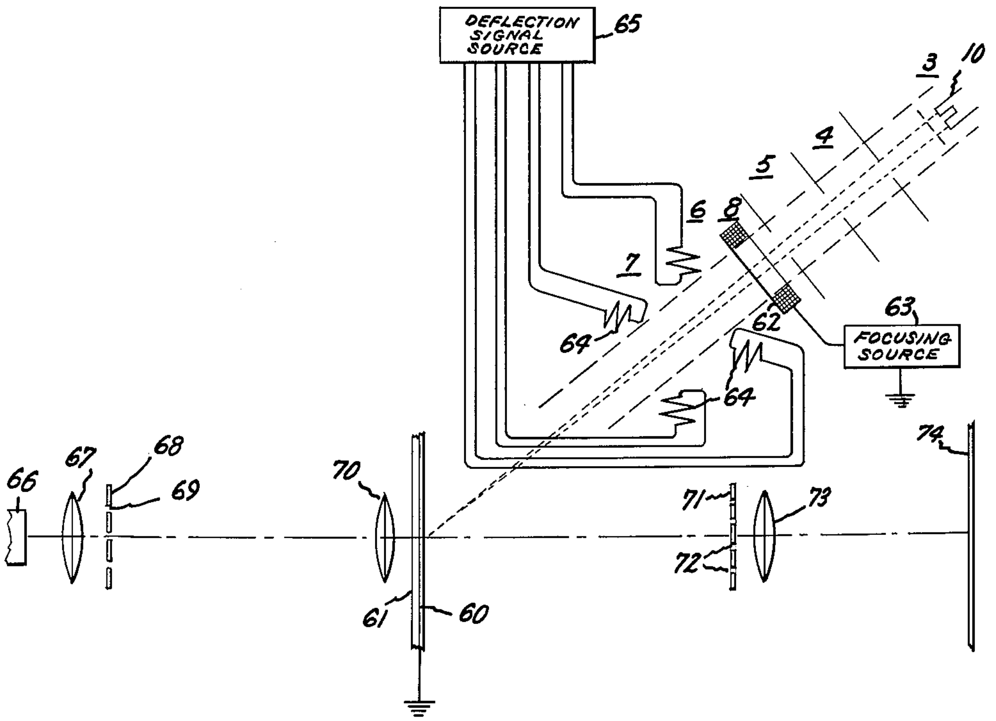

The novel features believed characteristic of the invention are set forth in the appended claims. The invention itself, however, together with further objects and advantages thereof, may best be understood by reference to the following description, taken in connection with the accompanying drawings in which:

FIG. 1 is a circuit diagram of an embodiment of my invention for forming diffraction gratings in a moving light modulating medium in response to fixed and variable color television signals, FIG. 2 is a circuit diagram of an embodiment of my invention forming diffraction gratings in a moving light modulating medium in response to three fixed color television signals, and FIG. 3 is a circuit diagram of an embodiment of my invention for forming diffraction gratings in a fixed light modulating medium.

In FIG. 1, an electron writing system enclosed in an evacuated enclosure 1 produces phase diffraction gratings in a light modulating medium 2 illustrated as a tape with a thermoplastic surface. Medium 2 is also in an evacuated enclosure (not illustrated). The characteristics of and some specific examples of suitable thermoplastic tapes are described and claimed in my copending application Serial No. 8,842 and divisional application thereof Serial No. 84,424. In application Serial No. 8,842, which is a continuation-in-part of application Serial No. 698,167, filed November 22, 1957 (now abandoned), I have described and claimed methods and apparatus for thermoplastic recording, including the impressing of, which is diffraction gratings on thermoplastic material. All of the above-mentioned copending applications are assigned to the assignee of this application. A readily available and suitable thermoplastic material is polystyrene, preferably of medium molecular weight. Although thermoplastic-coated material is preferred, medium 2 may be another movable material that, when subject to an electron charge or beam, changes in physical characteristics, such as transparency or surface irregularity, affecting the transmission or reflection of light.

Before describing each of the components of the electron writing system in detail the function of each component will first be briefly mentioned. These components include: an electron gun assembly 3, a beam splitting means 4, a density control means 5, a vertical focusing and combining system 6, a deflection system 7, and a horizontal focusing system 8.

At an end of enclosure 1, electron gun assembly 3 produces an upper and a lower electron beam. Each is of suitable density for forming the desired charge lines of electron charge on medium 2.

Beam splitting means 4 splits each beam into a set of electron beams that converge as if originating from a plurality of electron beam sources extending along a horizontal line through electron gun assembly 3. Through control of the angles of convergence, these beams are made to strike medium 2 along a horizontal line with predetermined separations. For the upper beam the separations are equal to the grating spacing of the diffraction grating corresponding to the fixed primary color, e.g. red. For the lower beam they vary with the color content of the televised picture. But they are always equal to the varying grating spacing of a diffraction grating corresponding to a color that varies between two primary colors, e.g. blue and green.

For good color purity, each beam should be split into at least three beams, but preferably not more than 7 or 8 due to difficulties of resolution. In one suitable arrangement, the upper beam was split into four beams and the lower beam into six. With this arrangement the upper set of beams forms grating lines that for adjacent raster lines join with separations equal to the grating spacing. Thus, all of these grating lines are equally separated. There may be overlapping of some grating lines. In general, as many beams should be used to form the variable color grating lines as the resolution of the system permits. This is desired since, due to the variation in grating line spacing the variable color grating lines for adjacent raster lines will very seldom join in phase. An in phase condition is obtained when the grating line spacings are an integral sub-multiple of the raster line spacings and the grating lines for adjacent raster lines either touch or overlap. The out of phase joinings produce desaturation of the projected color, which desaturation can be minimized by the use of a large number of grating lines.

Density control means 5 controls the widths, and thus the densities, of the lines of charge on medium 2. In turn, the charge densities determine the amplitudes of the diffraction gratings and hence, the intensities of the primary colors of the projected image.

Vertical focusing and combining system 6 focuses each set of electron beams on medium 2 in a vertical direction. It also combines the plurality of beams from both the upper and lower beams, causing them to extend along substantially the same horizontal line on medium 2.

Deflection system 7 produces vertical movement between the electron beams and light modulating medium 2. For television applications, this movement is at the television horizontal deflection rate: 15,750 cycles per second. Thus, when used in an optional system, medium 2 extends in a vertical direction rather than in the horizontal direction as is illustrated in FIG. 1.

Horizontal focusing system 8 focuses both sets of electron beams in a horizontal direction on medium 2.

When the set of beams from the splitting of the upper beam deflects across the width of medium 2, it produces vertical lines of charge 9. The point densities of these lines correspond to the instantaneous amplitude of the red video signal when the respective line points were formed by the electron beams. The separations between these lines equals the grating spacing of the desired red diffraction grating. Similarly, the other set of beams produces vertical lines of charge 9 with densities corresponding to the amplitude of the variable color video signal and with separations equal to the variable color grating spacing. Either prior or subsequent to the formation of these lines 9, the thermoplastic surface is heated to a plastic condition by means not shown. This permits these lines of charge 9 to deform the thermoplastic surface into diffraction gratings the amplitudes and grating spacings of which correspond to the densities and separations of the charge lines 9.

Referring to the components of FIG. 1 in more detail, electron gun assembly 3 comprises two point electron beam sources illustrated as two hairpin filaments 10. They are heated by a source of electrical energy (not shown) connected to two input terminals 11. Filaments 10 are maintained at a highly negative potential by a direct voltage source (not illustrated). A beam current control electrode 12 with two apertures 13 and 14 for the transmission of the upper and lower beams, respectively, is energized with a beam current control voltage from a source (not shown) connected to a terminal 15. Ground potential applied to an anode 16 determines the beam voltage.

The optimum current and voltage for each of the electron beams produced by assembly 3 depend upon the particular characteristics of the electron writing system in which these beams are used. Among the factors to be considered are: the nature of the thermoplastic coating on medium 2, the width of medium 2, the length of the electron writing system, the band width of the modulating signals, the raster size, and the desired resolution. For some applications suitable electron beam magnitudes are of the order of 1 microampere at acceleration potentials of approximately 8–15 kilovolts.

An approximate expression for the current density required to produce a diffraction grating having a grating spacing W and an amplitude A is:

$$i=\frac{4\times 10^{-8}}{Wt}\sqrt{2\epsilon TA}$$

wherein $\epsilon$ is the dielectric constant of the medium 2, T is the surface tension in dynes/cm., and $t$ is the length of dwell in seconds of the beams at any spot on medium 2 having dimensions corresponding to a picture element.

Splitting means 4 includes two sets 17 and 18 of a plurality of small diameter wires extending across apertures 19 and 20, respectively, in anode 16. In a typical application there may be approximately 75 wires in set 17 and 110 in set 18, but the number of wires subtended by the two beams is only a few. That is, the beams intercept only a few wires near the centers of the respective wire sets 17 and 18. By the use of large numbers of wires, better field distributions are obtained. Apertures 19 and 20 transmit the upper and lower electron beams, respectively.

Wire set 17, which is insulated from anode 16 by means not shown, is maintained several hundred volts positive with respect to anode 16 by a voltage from a potentiometer 21 connected across a source of direct voltage 22. The resulting electric field is extended over a large portion of the upper beam path by two electrodes 23 connected to anode 16.

The splitting action of the upper beam is produced by different potential gradients. Assume for purposes of explanation that the upper beam intercepts four wires of the set 17. Then the two portions of the upper electron beam passing between anode 16 and the two end wires of these four wires are acted upon by large potential gradients resulting from the proximity of these end wires to anode 16. These gradients divert these two beam portions through equal relatively large angles towards the system axis. The lesser potential gradients between anode 16 and the wires adjacent these end wires diverts, to a lesser degree, the portions of the beam passing in the regions of these gradients. The center beam portion, which is not acted upon by any potential gradients, is not diverted. These different converging forces split the upper electron beam into a set of beams that are mutually convergent at angles dependent upon the voltage applied to the wire set 17.

These beams converge as if originating from a plurality of sources, one for each beam, extending along a horizontal line through the upper hairpin filament in electron gun assembly 3. The spacings between these virtual sources, and consequently the horizontal separations of the beams when focused on medium 2 depend upon the voltage difference between anode 16 and wire set 17. By movement of the arm on potentiometer 21, these separations are made equal to the grating spacing of the red diffraction grating, which may be of the order of one micron. Thus, the setting of the arm on potentiometer 21 determines the grating spacing of the red diffraction grating.

Wire set 18, also insulated from anode 16, is maintained at a varying potential several hundred volts positive with respect to anode 16. The instantaneous magnitude of this voltage depends upon the instantaneous green and blue color intensities in the televised picture. For reasons explained below, this voltage is equal to the sum of a constant and the logarithm of the ratio of the blue to green television signals.

The circuit providing this variable voltage includes sources 24 and 25 of green and blue video signals, respectively, that provide voltages of increasing amplitude when the green and blue color intensities increase. Circuit details are not illustrated since these sources may correspond to the video circuits in a color television camera or receiver. In some of these circuits, these signals decrease for increasing color intensities. If so, the desired signals are obtained by phase inversion.

The circuit components for converting these green and blue video signals to the desired logarithmic form comprise two logarithmic amplifiers 26 and 27 and a pentode circuit having a pentode 28 and a plate electrode resistor 29. The operating direct voltages are applied from sources (not illustrated) to the plate electrode circuit through a terminal 30 and to the screen electrode through a terminal 31.

In the operation of this circuit, the green video signal is converted to logarithmic form by amplifier 26 and conducted to the grid electrode of pentode 28. The blue video signal is converted to logarithmic form by amplifier 27 and conducted to the cathode. Since the logarithmic green video signal is applied to the grid electrode, it produces a minus logarithmic signal across resistor 29. The logarithmic blue video signal, applied to the cathode electrode, produces a positive logarithmic signal across resistor 29. Thus, a difference signal is produced across resistor 29 equal to the logarithm of the blue video signal minus the logarithm of the green video signal. From conventional logarithmic considerations it is apparent that this difference signal is identical to the logarithm of the ratio of the intensities of the blue and green video signals. This varying signal, which appears at the plate electrode of pentode 28, is directly coupled to wire set 18.

With the plate electrode of pentode 28 directly connected to wire set 18, a constant potential is also applied to this wire set. This potential is a function of the magnitude of resistor 29 as well as the potential applied to terminal 30.

The total signal applied to wire set 18 has a varying component the peak magnitude of which is of the order of 50 volts and a constant component of the order of 250 volts positive with respect to anode 16. This constant component should correspond to the color produced when the blue and green color intensities are equal. For a conventional color television system the wavelength of this color is approximately 4930 Angstroms.

Before proceeding with the discussion of the FIG. 1 embodiment, I will briefly explain the variable color system described and claimed in my afore-mentioned copending application S.N. 688,597. In a preferred embodiment, a large range of colors are produced by two diffraction gratings, one corresponding to the red color content and the other to the relative blue and green color content of the televised picture. As is explained in the above application, all of the colors that can be obtained through the combination of the fixed blue, green, and red primary colors of the color television system can also be obtained through use of one fixed primary color, for example, red, and a primary color varying between two colors, for example, blue and green.

To obtain the function for this variable primary color, a line is drawn through the two points on the Commission Internationale d'Eclairage chromaticity diagram corresponding to the blue and green primary colors of a color television system. Then the colors along this line are plotted against the relative intensities of the blue and green primary colors required to produce the colors along this line. The obtained curve is approximately a logarithmic function. That is, the wavelength of each color along this line is a function of the logarithm of the ratio of the intensities of the blue to green primary colors that when added produce this color.

For an illustration of this, assume that a portion of the televised picture is violet. In a conventional color television system certain red, blue and green primary color intensities are combined to produce this violet color. However, in my variable color system the blue and green primary color components are not used individually. Instead, the logarithm of the ratio of their intensities is utilized to produce a diffraction grating that diverts to the projection screen, light of a color that when added to red produces a violet color. For the projection of different colors, the color added to red is different. Consequently, it is called a variable color.

Referring again to FIG. 1, the logarithmic signal, when applied to the wires of set 18, produces a potential gradient extended by electrodes 32—that spits the lower beam into a set of beams. These beams strike medium 2 at separations equal to the grating spacing of the diffraction grating for the variable color. When the green or blue content of this picture changes, so does the variable color signal, and thus these separations.

The wires of sets 17 and 18 should be small in diameter e.g., .3 mil. The electrons intercepted by large diameter wires produce significant charges on insulating coatings often formed on wire surfaces. Such charges adversely affect the splitting operation. The separations between these wires may be of the order of 4 or 5 times the wire diameters.

The density control means 5 includes three deflection plates 33, 34 and 35. They are vertically arranged such that the upper set of beams passes between plates 33 and 35 while the lower set of beams passes between plates 34 and 35.

The energizing signal for these plates include a conventional $Y-R$ television signal from a source 36 which energizes plate 33. The Y signal is the sum of the intensities of the red, green, and blue video signals while the R signal is the intensity of the red video signal. Thus, the $Y-R$ signal is the sum of the intensities of the green and blue video signals. A $Y-R$ signal is available in conventional color television receiver and camera circuits. It also can be obtained by adding the output signals from the green and blue video signal sources 24 and 25.

The other two plates 34 and 35 are, respectively, grounded and energized by a Y signal from a signal source 37. The Y signal is obtainable from conventional color television circuits.

The voltage deflecting the lower beams is equal to the difference in voltages on plates 33 and 34. With plate 34 grounded and the green plus blue signals applied to deflection plate 33, this voltage is the sum of the green plus blue video signal intensities.

The voltage deflecting the upper beams is the voltage difference between plates 33 and 35—the red video signal.

The above-mentioned deflection voltages control the charge densities of lines 9. For example, the green and blue video voltages between plates 33 and 34 deflect the lower beams in a horizontal direction away from the axis of the horizontal focusing system 8 causing them to be defocused in a horizontal direction. The greater these signals the greater the defocusing and, consequently, the greater the spreading of the corresponding lines 9 on medium 2. With increases in spreading, the charge densities decrease and with it the amplitudes of the variable color diffraction grating. Thus, the larger the magnitude of the green and blue signals the lower the amplitude of the variable color diffraction grating.

This inverse relationship between the green and blue color video signals and the amplitude of the variable color diffraction grating is necessary for intensity correspondence between the televised and projected pictures. When these signals are large the blue and green content of the televised picture is low. Then since these signals lower the amplitude of the variable color diffraction grating, the intensities of these colors obtained when medium 2 is placed in an optical system, are low.

The deflection of the upper beams is similar. When the red color content in the televised picture is low, the large red video signal deflects the upper set of beams from the horizontal focusing system 8 axis thereby spreading the corresponding lines of charge 9 and decreasing their densities. The resulting diffraction grating, which has a low amplitude, diverts only a small portion of the red light to the projection screen when the modulating medium 2 is placed in an optical system.

The maximum magnitude of deflection signals should be such that a substantially uniform electron charge is obtained on medium 2. In some applications the maximum signals may be of the order of 2 volts.

The vertical focusing and combining system 6 comprises an einzel lens with two sets 38 and 39 of three horizontally extending rods arranged on opposite sides of the beams. The end rods of both sets are grounded. The center ones are energized by a potential of several kilovolts, preferably negative, from a source 40. This lens focuses both upper and lower beams on medium 2 in a vertical direction.

The combining action is obtained by a rod 41 positioned between the upper and lower beams. It is maintained at a few hundred volts positive with respect to ground by a voltage from a potentiometer 42 connected across a source of direct voltage 43. The positive potential on rod 41 attracts both pluralities of beams towards the system axis, making them incident on medium 2 approximately along the same horizontal line. Consequently, the two diffraction gratings are superimposed in a vertical direction.

In system 7 a deflection voltage applied to two plates 44 from a source 45 of deflection signal deflects the electron beams across the width of medium 2. Plates 44, although illustrated as producing vertical deflection, are energized with a conventional horizontal television deflection signal. Thus, when utilized in the optical system, medium 2 should be moved in a vertical direction for the projection of an upright picture.

The horizontal focusing system 8 comprises an einzel lens with two sets 46 and 47 of three vertically extending rods arranged on opposite sides of the electron beams. The end rods of both sets 46 and 47 are grounded. A source 48 energizes the center ones with a horizontal focusing signal that is preferably several kilovolts negative. With system 8 closer to medium 2 than system 6, it has more effect on the electron beams. Thus, each beam is incident on medium 2 in the form of a rectangle with the smaller dimension in the horizontal direction.

A conventional horizontal deflection system is not provided. If medium 2 were a fixed light modulating medium the beams would have to be deflected horizontally to provide an area raster. However, with a moving-type light modulating medium 2, horizontal movement between the beams and medium 2 can be provided by moving medium 2 horizontally by means of a motor 49. It should move medium 2 at the conventional vertical television deflection rate: 60 raster heights per second. This movement, being continuous, prevents the two fields of each frame in an interlace system from superimposing on the same raster area. Instead, each field produces a separate "frame," and the superimposing of adjacent "frames" for a complete frame occurs in the viewer's eye, due to persistence of vision, when the medium 2 is used in an optical system.

As the beams from the splitting of the upper beam deflect across the width of medium 2 they produce vertically extending lines of charge 9 the charge densities of which correspond to the red color content of the televised picture. Subsequently, when the thermoplastic surface of medium 2 is made plastic, by means not shown, these lines of charge, which are attracted to a conducting layer in medium 2, produce a phase diffraction grating corresponding to the red color content of the televised picture.

Similarly, the beams from the splitting of the lower beam produce vertically extending lines of charge 9 intermixed with the above-mentioned lines of charge, the charge densities of which correspond to the blue and green color content of the televised picture. When the thermoplastic surface of medium 2 is heated plastic, they form a phase diffraction grating corresponding to the variable primary color.

It is to be understood that in operation of this system, blanking signals are applied to electrode 12 after each deflection of the beams cut off the beam current. With the use of a blanking signal, a return trace is not produced on medium 2. Since the circuits for producing this blanking signal may be the same as are used in conventional television receivers, these circuits have not been illustrated.

The vertical lines of charge 9 formed by the upper beams, and the lower beams also if the variable color does not change, are coincident for successive frames if medium 2 is not moved. This coincidence is provided by the formation of the lines of charge 9 in the same direction as the deflection—the vertical direction. This coincidence is not very significant in the application illustrated in which a moving-type light modulating medium 2 is utilized. But in a variable color system with a fixed light modulating medium, it eliminates formation of interference gratings between the residual and new grating lines.

Using sets of beams eliminates the need for radio frequency carrier signals required in prior systems for producing diffraction gratings with desired grating spacings. In these prior systems the grating line spacings of the diffraction grating are determined by the frequencies of the radio frequency carrier signals. In the system of the present application the grating line spacings of the diffraction gratings formed on medium 2 are determined by voltages, not having radio frequency carrier signals, that are applied to wire sets 17 and 18.

Another advantage of the system of FIG. 1 is that focusing system 8 can be placed adjacent medium 2.

In that position it has the most effect for focusing the electron beams in a direction normal to the lines of charge 9. Consequently, the resolution between the lines of charge 9 is high and diffraction gratings with short grating spacings can be produced.

In FIG. 2 I have illustrated an embodiment of my invention for forming three diffraction gratings corresponding to three fixed primary colors: red, blue, and green. In the following discussion of this embodiment, only those components differing from the previously described ones are described in detail and corresponding parts are designated by the same reference numerals.

In the electron gun assembly 3 of FIG. 2, three electron beams are produced by a filament 50 with three point sources. These beams pass through three apertures 13, 14, and 51 in control electrode 12.

Splitting means 4 includes three wire sets 17, 18, and 52 extending across apertures 19, 20, and 53, respectively, in anode 16. These apertures are aligned with apertures 13, 14, and 51, respectively. Three potentiometers 21, 54, and 55 energize wire sets 17, 18, and 52, respectively, with fixed voltages for splitting the electron beams. These voltages split the upper, middle, and lower electron beams into sets of beams. The beams in each of the three sets strike modulating medium 2 at separations equal respectively, to the grating spacings for the desired red, green, and blue diffraction gratings. The operation is the same as that previously explained for the red diffraction grating in the FIG. 1 embodiment.

Two electrodes 56 extend the electric field between wire set 52 and anode 16.

In the density control means 5, the sets of beams pass between grounded deflection plate 33 extending along one side of the beam paths and three signal-energized deflection plates 34, 35, and 57 on the other side. A red video signal, applied to deflection plate 35 from a source 58, deflects the upper set of beams horizontally away from the axis of focusing system 8 with amplitudes corresponding to the amplitudes of the red video signal. Similarly, a green video signal applied to plate 34 from source 24 and a blue video signal applied to plate 57 from source 25 deflect the central and lower sets of beams as functions of the amplitudes of the green video signal and blue video signal, respectively. Consequently, three different sets of vertical lines of charge 9 are formed on modulating medium 2 with charge densities corresponding respectively, to the red, green and blue color content of the televised picture. As previously mentioned, the separations between the lines of charge of each set are equal respectively, to the grating spacings for the desired red, green, and blue diffraction gratings.

With the use of three sets of electron beams, another wire 59 must be inserted in the vertical focusing and combining means 6 for diverting the lower set of beams towards the system axis. By placing wires 41 and 59 at the same potential, the middle set of beams passing through these wires, is not diverted.

From the explanation of the FIG. 1 embodiment, it should be apparent that in FIG. 2 the three sets of vertically extending lines of charge 9 form three diffraction gratings corresponding to the red, green, and blue color content of the televised picture. These diffraction gratings diffract red, green, and blue light through the masking system in a suitable optical system. This transmitted light is projected on a projection screen where it reproduces the televised picture. A suitable optical system is described in the previously mentioned patent and also is described in the discussion, below, of the FIG. 3 embodiment.

In FIG. 3 I have illustrated a system for producing diffraction gratings in a stationary light modulating medium such as an oil film 60 on a transparent support 61. Support 61 has a conducting surface to which electrons are attracted. The system for forming the diffraction gratings may be the electrostatic embodiment of FIG. 1 or 2, with the addition of a vertical deflection system. But, to further illustrate the versatility of my invention, I have shown a system with electromagnetic focusing and deflection components.

In the focusing section a focusing coil 62 is energized by current from a focusing signal source 63. In the deflection system, the deflection, which must be in two directions since medium 60 is fixed, is produced by current flow through a plurality of deflection coils 64 that are energized from a deflection signal source 65. These focusing and deflection components may be the same as that utilized in conventional television circuits for focusing and deflecting the electron beam, except that the focusing coil should produce much higher resolution. The diameter of the beam spot is approximately 1/10 that in a television tube.

Another distinction from the embodiments of FIGS. 1 and 2 is the filament 10 in FIG. 3 which comprises, instead of point sources, line sources that are parallel with the diffraction lines formed in medium 60. These line sources produce a greater beam current than do point sources but they decrease the resolution of the diffraction gratings in the direction parallel with the line sources. However, this decrease in resolution can be tolerated since for equal picture resolution in the horizontal and vertical directions the resolution does not have to be as good in a direction parallel with the diffraction grating lines as normal to them. That is, a number of grating lines are required for a picture element. Thus, for a square picture element, each grating line must be much narrower than it is long. Even though point sources are used in the embodiments of FIGS. 1 and 2, there is less resolution parallel with the grating lines than normal to them. This difference in resolution results from the difference in distances to the modulating medium 2 from the vertical focusing system 6 and the horizontal system 8. In FIG. 3 both the horizontal and vertical focusing systems are at the same distance from medium 2—the position of coil 62. Consequently, the focusing system produces the same focusing in both the horizontal and vertical direction.

In FIG. 3 I have not illustrated the details of the splitting means 4 nor of the density control means 5 since they may be the same as that previously described. Also, for the same reason some of the components of the electron gun assembly 3 have been omitted.

In FIG. 3 I have also illustrated a suitable optical system in which the diffraction gratings in medium 60 diffract white light to produce a color image corresponding in point-by-point relationship with the televised picture. In this optical system a very bright light source 66 produces a light beam that is projected by a lens system 67 on a first masking system comprising opaque bars 68 and slits 69. The thin light sources produced by slits 69 are imaged by a lens 70 through the modulating medium 60 onto some opaque bars 71 of a second masking system in the absence of diffraction gratings in modulating medium 60. Any diffraction gratings in film 60 with grating lines parallel to slits 69 diffract certain colors of the light through an angle such that the colors are transmitted by slits 72 between bars 71. This transmitted light is then imaged by a lens system 73 on a projection screen 74 to form color images of the applied video signals. The criteria for the dimensions of this optical system are presented in my copending application S.N. 15D–1508, filed concurrently herewith and assigned to the assignee of the present invention.

Although I have described my invention in relation to producing diffraction gratings corresponding to applied color video signals, it should be apparent that other types of signals, as for example, computer signals can be used. Also, the diffraction gratings do not have to be phase diffraction gratings, but instead may be intensity diffraction gratings. Likewise, the selection of primary colors is arbitrary, except that the ones described are most convenient for color television applications.

While the invention has been described with respect to certain specific embodiments, it will be appreciated that many modifications and changes may be made by those skilled in the art without departing from the spirit of my invention. I intend, therefore, by the appended claims to cover all such modifications and changes as fall within the true spirit and scope of my invention.

What I claim as new and desire to secure by Letters Patent of the United States is:

1. A system for producing on a medium lines of electron charge with controllable separations, comprising means providing an electron beam, means responsive to an applied voltage for splitting said electron beam into a plurality of electron beams having virtual sources spaced in a given direction in accordance with the magnitude of said applied voltage, means for focusing said plurality of beams on said medium in mutually spaced relation in said direction and means for deflecting said electron beams in a direction normal to said given direction.

2. A system for producing on a medium lines of electron charge with controllable separations and charge densities, comprising means providing an electron beam, means responsive to an applied voltage for splitting said electron beam into a plurality of electron beams spaced in a given direction in accordance with the magnitude of said voltage, means for focusing said plurality of beams on said medium in mutually spaced relation in said given direction, means responsive to a second voltage for defocusing said plurality of beams in a direction parallel to said given direction to control the charge densities of the lines of charge on said medium in accordance with said second voltage, and means for deflecting said plurality of beams in a direction normal to said given direction.

3. A system for producing on a medium lines of electron charge with controllable separations comprising means for producing a plurality of electron beams mutually spaced in a given direction and converging at angles that are a function of a voltage applied to said means, means for focusing said beams on said medium in mutually spaced relation in said given direction in accordance with the magnitude of said voltage and means for producing relative movement between said electron beams and said medium in a direction normal to said given direction.

4. A system for producing on a medium lines of electron charge with controllable separations and charge densities, comprising means for producing a plurality of electron beams mutually separated in a given direction and converging at angles that are a function of the magnitude of a voltage applied to said means, means for focusing said beams on said medium in mutually spaced relation in said given direction in accordance with the magnitude of said voltage, means responsive to another voltage for defocusing said beams in a direction parallel to said given direction to vary the charge densities of the lines of charge established on said medium in accordance with the magnitude of said second voltage, and means for producing relative movement between said beams and said medium in a direction normal to said given direction.

5. In a system for forming a phase diffraction grating in a deformable medium, said grating varying in amplitude as a function of the amplitude of an applied electrical signal and a wavelength corresponding to the amplitude of a second voltage, the combination comprising means for simultaneously impinging a plurality of electron beams on said medium with spacings in a given direction corresponding to the grating spacing of the desired diffraction grating, means for producing relative movement between said electron beams and said medium in a direction normal to said given direction to produce lines of charge on said medium, and means for controlling the charge densities of said lines as a function of the magnitude of said electrical signal.

6. A system for producing on a medium lines of electron charge with controllable separations, comprising means for simultaneously impinging a plurality of electron beams on said medium with spacings in a given direction that are a function of an applied voltage, and means for producing relative movement between said electron beams and said medium in a direction normal to said given direction.

7. A system for producing on a medium lines of electron charge with controllable separations and electron charge densities, comprising means responsive to an applied electrical signal for simultaneously impinging a plurality of electron beams along a line on said medium with separations in a given direction that are a function of the magnitude of said signal, means responsive to another electrical signal for controlling the widths of said beams in a direction parallel to said line as a function of the magnitude of said another electrical signal to control the electron charge densities thereof, and means for producing relative movement between said electron beams and said medium in a direction normal to said given direction.

8. A system for producing on a medium lines of electron charge with controllable separations and electron charge densities, comprising means for producing an electron beam, means responsive to an applied electrical signal for splitting said electron beam into a plurality of electron beams mutually convergent at angles that are a function of the magnitude of said applied electrical signal, means for focusing said beams on said medium and spaced apart in a given direction, means for deflecting said beams normal to said given direction, means adjacent said medium for focusing said beams in said direction, and means responsive to another applied electrical signal for defocusing said beams in said direction as a function of the magnitude of said another applied electrical signal to control the charge densities of said line .

9. A system for simultaneously producing on a medium several sets of lines of electron charge with controllable separations, comprising means for producing a plurality of electron beams, a plurality of means each responsive to a voltage applied thereto for splitting each of said electron beams, respectively, into a set of electron beams mutually spaced in a given direction and convergent at angles that are a function of the amplitude of the respective applied voltages, means for combining and focusing said sets of electron beams so that they are incident on said medium to provide a plurality of sets of superimposed lines of charge spaced in said given direction and means for deflecting said sets of beams in a direction normal to said given direction.

10. The system as defined in claim 9 and means responsive to other applied electrical voltages for defocusing said sets of beams in said given direction as a function of the magnitudes of different ones of said other applied electrical voltages to control the densities of said sets of lines of electron charge.

11. A system responsive to color television signals for producing diffraction gratings in a light modulating medium corresponding to a display, comprising a light modulating medium with a deformable surface, means for simultaneously subjecting said light modulating medium to a plurality of sets of electron beams, wherein the beams in each set have separations and densities corresponding, respectively, to different primary colors and the intensities of those colors in said display, and means for producing relative movement between said medium and said beams in a direction normal to the direction of the spacings of said beams to produce sets of lines of electron charge on said medium, wherein the lines of charge in each of said sets have separations and charge densities corresponding, respectively, to said different primary colors and the intensities of those colors.

12. A system responsive to color television signals for producing diffraction gratings in a light modulating medium corresponding to a display, comprising means for producing a plurality of sets of converging electron beams that strike said medium at spaced distances in a given direction, wherein the beams of each set converge at angles that correspond to a different primary color of said display, means for controlling the densities of each of said sets of beams on said medium as a function of the intensity of the corresponding one of said primary colors, and means for deflecting said beams in a direction normal to said given direction to produce sets of lines of electron charge on said medium, wherein the lines of charge in each of said sets have separations corresponding to the different primary colors and charge densities corresponding, respectively, to the intensities of said different primary colors.

13. A system responsive to color television signals for producing diffraction gratings in a light modulating medium corresponding to a display, comprising means for producing a plurality of electron beams, means for splitting each of said beams into a set of converging electron beams, wherein the beams of each of said sets converge at angles that correspond to a different primary color of said display, means for focusing each beam of said sets on said medium and mutually spaced in a given direction, means for deflecting said sets of beams in a direction normal to said given direction to produce corresponding sets of lines of electron charge on said medium, wherein the lines of charge in each of said sets have separations corresponding to the respective different primary colors, and means for controlling the widths of the electron charge lines of each of said sets of lines as a function of the intensities of the corresponding primary color.

References Cited in the file of this patent

UNITED STATES PATENTS

| | | |
|---|---|---|
| 2,723,305 | Raibourn | Nov. 8, 1955 |
| 2,740,829 | Gretener | Apr. 3, 1956 |
| 2,742,522 | Law | Apr. 17, 1956 |
| 2,757,231 | Law | July 31, 1956 |
| 2,857,458 | Sziklai | Oct. 21, 1958 |

UNITED STATES PATENT OFFICE

CERTIFICATE OF CORRECTION

Patent No. 3,065,295 November 20, 1962

William E. Glenn, Jr.

It is hereby certified that error appears in the above numbered patent requiring correction and that the said Letters Patent should read as corrected below.

Column 2, line 12, for "on" read -- one --; line 55, after "invention" insert -- for --; column 3, line 2, strike out ", which is"; column 6, line 51, for "spits" read -- splits --.

Signed and sealed this 8th day of October 1963.

(SEAL)
Attest:

ERNEST W. SWIDER
Attesting Officer

EDWIN L. REYNOLDS
Acting Commissioner of Patents